(12) United States Patent
Hotaling et al.

(10) Patent No.: US 8,523,698 B2
(45) Date of Patent: Sep. 3, 2013

(54) GOLF PUTTER

(75) Inventors: Bryan R. Hotaling, Harvard, MA (US); James R. Varney, Maynard, MA (US)

(73) Assignee: Product Insight, Inc., Acton, MA (US)

( * ) Notice: Subject to any disclaimer, the term of this patent is extended or adjusted under 35 U.S.C. 154(b) by 45 days.

(21) Appl. No.: 13/274,431

(22) Filed: Oct. 17, 2011

(65) Prior Publication Data
US 2013/0095953 A1 Apr. 18, 2013

(51) Int. Cl.
*A63B 69/36* (2006.01)
*A63B 53/04* (2006.01)

(52) U.S. Cl.
USPC ........... 473/251; 473/329; 473/332; 473/340; 473/349

(58) Field of Classification Search
USPC .......................................... 473/324–350, 251
See application file for complete search history.

(56) References Cited

U.S. PATENT DOCUMENTS

| | | | | |
|---|---|---|---|---|
| 1,562,956 A * | 11/1925 | Guerne | ........................ | 473/329 |
| 5,197,737 A * | 3/1993 | Desbiolles et al. | ........... | 473/341 |
| 5,820,481 A | 10/1998 | Raudman | | |
| 6,001,030 A * | 12/1999 | Delaney | ........................ | 473/329 |
| D426,599 S * | 6/2000 | Morgan et al. | ............... | D21/736 |
| 6,095,931 A * | 8/2000 | Hettinger et al. | ............. | 473/341 |
| 6,171,203 B1 * | 1/2001 | Huang | ........................... | 473/305 |
| 6,270,423 B1 * | 8/2001 | Webb | ............................. | 473/226 |
| 6,273,831 B1 * | 8/2001 | Dewanjee | ..................... | 473/324 |
| 6,328,661 B1 * | 12/2001 | Helmstetter et al. | .......... | 473/324 |
| 6,334,818 B1 | 1/2002 | Cameron et al. | | |
| 6,336,869 B1 | 1/2002 | Hettinger et al. | | |
| 6,406,379 B1 | 6/2002 | Christensen | | |
| 6,431,997 B1 | 8/2002 | Rohrer | | |
| 6,478,694 B2 * | 11/2002 | Anderson et al. | ............. | 473/350 |
| 6,488,594 B1 * | 12/2002 | Card et al. | .................... | 473/340 |
| 6,663,502 B2 | 12/2003 | Nelson et al. | | |
| 6,743,112 B2 * | 6/2004 | Nelson | .......................... | 473/251 |
| 6,921,343 B2 * | 7/2005 | Solheim | ........................ | 473/329 |
| 6,951,518 B2 | 10/2005 | Solheim et al. | | |
| 7,048,646 B2 | 5/2006 | Yamanaka et al. | | |
| 7,101,290 B2 * | 9/2006 | Tucker, Sr. | .................... | 473/340 |
| 7,112,147 B2 * | 9/2006 | Solheim et al. | ............... | 473/340 |
| 7,175,540 B2 | 2/2007 | Sano | | |
| 7,273,420 B2 * | 9/2007 | Wright | .......................... | 473/329 |
| 7,354,356 B2 | 4/2008 | Yamanaka et al. | | |
| 7,374,499 B2 * | 5/2008 | Jones et al. | .................... | 473/340 |
| 7,473,186 B2 | 1/2009 | Best et al. | | |
| 7,500,923 B2 | 3/2009 | Tateno | | |
| 7,641,569 B2 * | 1/2010 | Best et al. | ...................... | 473/329 |
| 7,717,801 B2 * | 5/2010 | Franklin et al. | ............... | 473/251 |
| 7,806,779 B2 | 10/2010 | Franklin et al. | | |
| 8,092,318 B2 * | 1/2012 | Oldknow et al. | .............. | 473/329 |
| 2010/0099510 A1 * | 4/2010 | Bryant et al. | .................. | 473/251 |
| 2010/0261546 A1 * | 10/2010 | Nicodem | ....................... | 473/340 |

\* cited by examiner

*Primary Examiner* — Sebastiano Passaniti
(74) *Attorney, Agent, or Firm* — Lando & Anastasi, LLP

(57) ABSTRACT

A golf putter head includes a metal back body adapted to be secured to a golf club shaft and a metal face body including a golf ball contact surface. The metal back body and the metal face body have non-planar, inter-fitting surfaces facing one another without contact across a gap defined by the inter-fitting surfaces. The golf putter head further includes a vibration dampening intermediate body filling the gap to isolate the metal face body from the metal back body. Other embodiments of golf putters and golf putter heads are further disclosed.

19 Claims, 6 Drawing Sheets

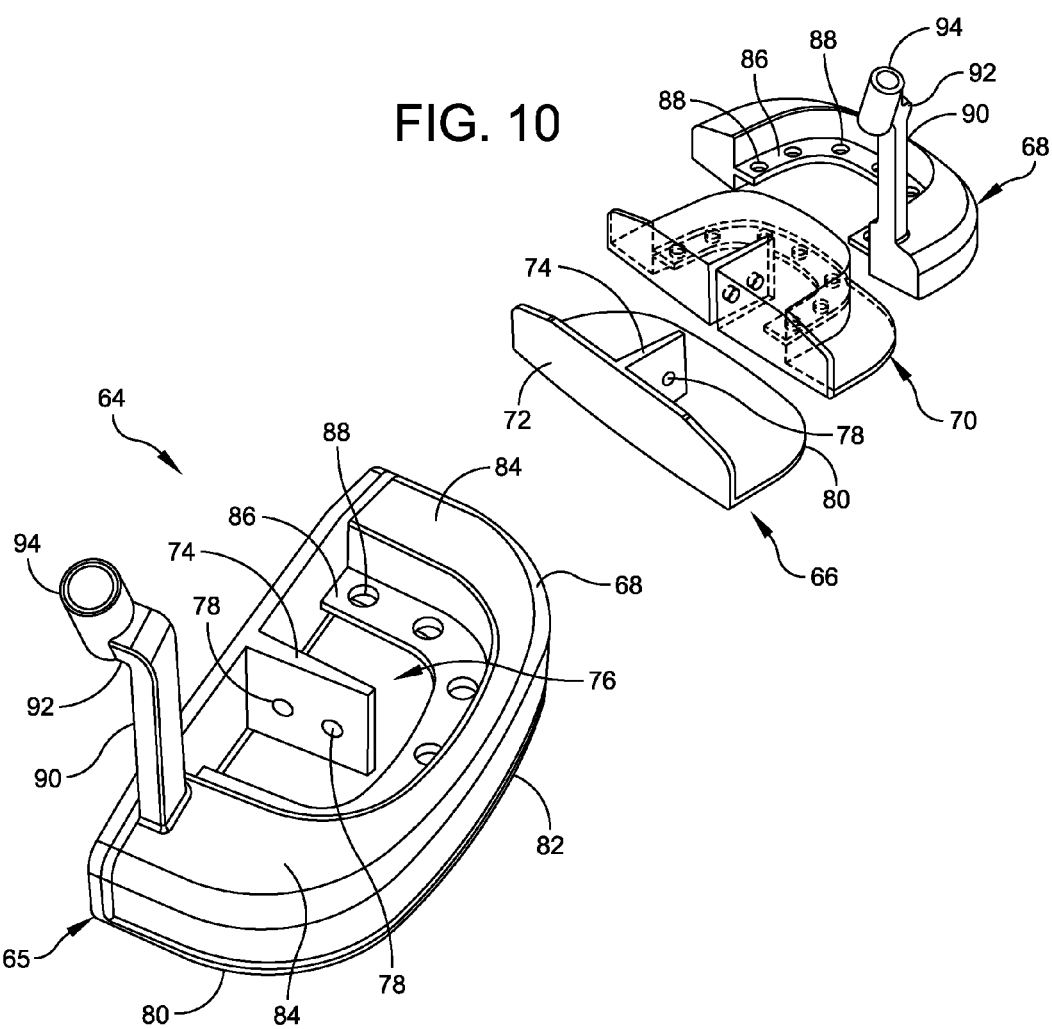

GOLF PUTTER

BACKGROUND OF THE INVENTION

1. Field of the Disclosure

The present disclosure relates generally to golf clubs, and more particularly to a golf putter.

2. Discussion of Related Art

A golf putter is a club used in golf to move the golf ball very short distances, typically on a putting green. The act of putting requires the player to precisely strike the golf ball along the putting green into a golf hole. Designs of golf putters are directed to improving the smoothness of the stroke, the glide of the golf putter along the putting surface, the ability to achieve solid impact when striking the golf ball, and reducing bounce when striking the golf ball to encourage topspin during the roll of the golf ball. Most golf putters include an elongate shaft and a head with a striking surface having a five to ten percent loft. The shaft includes a grip that does not have to be round, but can include a flat top and curved underside.

Some golf putters incorporate inserts to dampen the vibration of the surface striking the ball when putting. Examples of golf putters having inserts can be found in U.S. Pat. Nos. 5,820,481, 6,334,818, 6,336,869, 6,406,379, 6,431,997, 6,663,502, 6,951,518, 7,048,646, 7,175,540, 7,354,356, 7,473,186, 7,500,923, 7,806,779, to name a few.

BRIEF SUMMARY OF THE INVENTION

One aspect of the disclosure is directed to a golf putter head including a metal back body adapted to be secured to a golf club shaft and a metal face body including a golf ball contact surface. The metal back body and the metal face body have non-planar, inter-fitting surfaces facing one another without contact across a gap defined by the inter-fitting surfaces. The golf putter head further includes a vibration dampening intermediate body filling the gap to isolate the metal face body from the metal back body.

Embodiments of the golf putter head include fabricating the vibration dampening intermediate body from a polymeric material. The polymeric material includes at least one of the following materials—urethane, polyester, silicone, rubber, polypropylene, polyethylene, polycarbonate, ABS, PVC, nylon, acrylic, and acetal. The vibration dampening intermediate body may adhere to at least one of the metal back body and the metal face body by use of an adhesive. The golf putter head may further include a hosel configured to attach the metal back body to the shaft. The metal face body may include a middle portion positioned between two end portions with the end portions having a thickness greater than a thickness of the middle portion. The metal back body may include a surface defining an irregularly-shaped opening. The metal face body may include an insert extending from a surface opposite the contact surface. The arrangement is such that the opening is configured to receive the insert therein to create the gap. The metal back body and/or the metal face body may include an interlocking feature configured to secure the metal back body and/or the metal face body to the vibration dampening intermediate body. In a certain embodiment, portions of the inter-fitting surfaces of the back body and the face body face one another.

Another aspect of the disclosure is directed to a golf putter including a shaft and a head. In one embodiment, the head includes a metal back body adapted to be secured to a golf club shaft and a metal face body including a golf ball contact surface. The metal back body and the metal face body have non-planar, inter-fitting surfaces facing one another without contact across a gap defined by the inter-fitting surfaces. The golf putter head further includes a vibration dampening intermediate body filling the gap to isolate the metal face body from the metal back body.

Embodiments of the golf putter include fabricating the vibration dampening intermediate body from a polymeric material. The polymeric material includes at least one of the following materials—urethane, polyester, silicone, rubber, polypropylene, polyethylene, polycarbonate, ABS, PVC, nylon, acrylic, and acetal. The vibration dampening intermediate body may adhere to at least one of the metal back body and the metal face body by use of an adhesive. The golf putter may further include a hosel configured to attach the metal back body to the shaft. The metal face body may include a middle portion positioned between two end portions with the end portions having a thickness greater than a thickness of the middle portion. The metal back body may include a surface defining an irregularly-shaped opening. The metal face body may include an insert extending from a surface opposite the contact surface. The arrangement is such that the opening is configured to receive the insert therein to create the gap. The metal back body and/or the metal face body may include an interlocking feature configured to secure the metal back body and/or the metal face body to the vibration dampening intermediate body. In a certain embodiment, portions of the inter-fitting surfaces of the back body and the face body face one another.

A further aspect of the disclosure is directed to a method of fabricating a head of a golf putter. In one embodiment, the method comprises: placing a back body and a face body in a mold with a gap being provided between the back body and the face body; depositing a polymeric material in the mold to create the vibration dampening intermediate body positioned between the back body and the face body; and removing the head from the mold.

The present disclosure will be more fully understood after a review of the following figures, detailed description and claims.

BRIEF DESCRIPTION OF THE DRAWINGS

For a better understanding of the present disclosure, reference is made to the figures which are incorporated herein by reference and in which:

FIG. 9 is a top perspective view of the head of a golf putter of FIG. 8; and

FIG. 10 is an exploded perspective view of the head of the golf putter of FIG. 8.

DETAILED DESCRIPTION OF THE INVENTION

Figure 1:
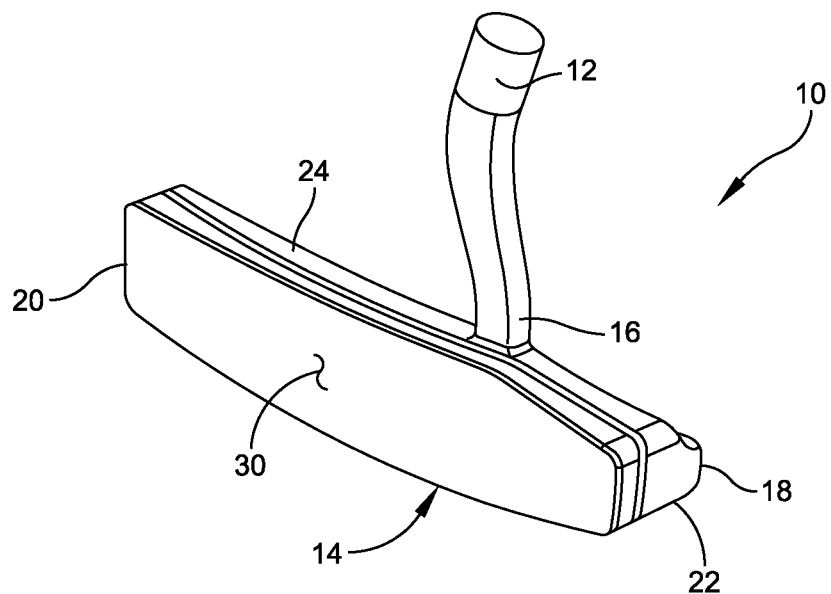
FIG. 1 is a front perspective view of a head of a golf putter of an embodiment of the present disclosure.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The embodiment described and shown in this disclosure is capable of other embodiments and of being practiced or being carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Figure 2:
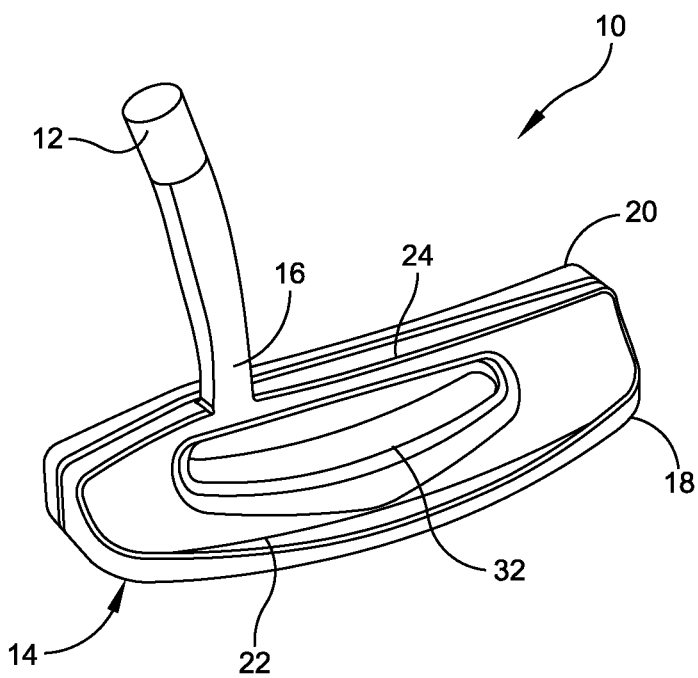
FIG. 2 is a back perspective view of the head of the golf putter.

Embodiments of the present disclosure are directed to a golf club, and more particularly a golf putter, which is generally indicated at 10 in FIGS. 1 and 2. As shown, the golf putter 10 includes a shaft 12, only a portion of which is shown throughout the drawings. The shaft 12 is elongate in construction, typically 32- to 35-inches in length, but may also be longer. For example, belly putters and long putters may be up to 48-inches in length. The shaft 12 is a tapered tube made of metal (usually steel) or carbon fiber composite (referred to as graphite). The shaft 12 is roughly 0.5 to 1.0 inches in diameter near the grip. The shaft 12 of the golf putter 10 can weigh from 1.6 to 5.3 ounces, depending on the material and length of the shaft. The shaft 12 includes a grip (not shown) provided at an upper end of the shaft. The grip enables the golfer to easily grip and manipulate the golf putter 10 when putting. The grip of the golf putter 10 can have a circular cross-section, but, as described above, may also include any cross section that is symmetrical along the length of the grip through at least one plane.

The golf putter 10 further includes a head, generally indicated at 14, which is attached to a lower end of the shaft 12 and configured to strike a golf ball (not shown). The golf putter 10 further may include a hosel 16 that is designed to connect the head 14 to the shaft 12. In some embodiments, the hosel 16 may be provided separately from the head 14 or be integrally formed with the head. The hosel 16 may be optimized to place as little mass as possible over the top of the head 14 of the golf putter 10 to lower the center of gravity of the golf putter.

Figure 3:
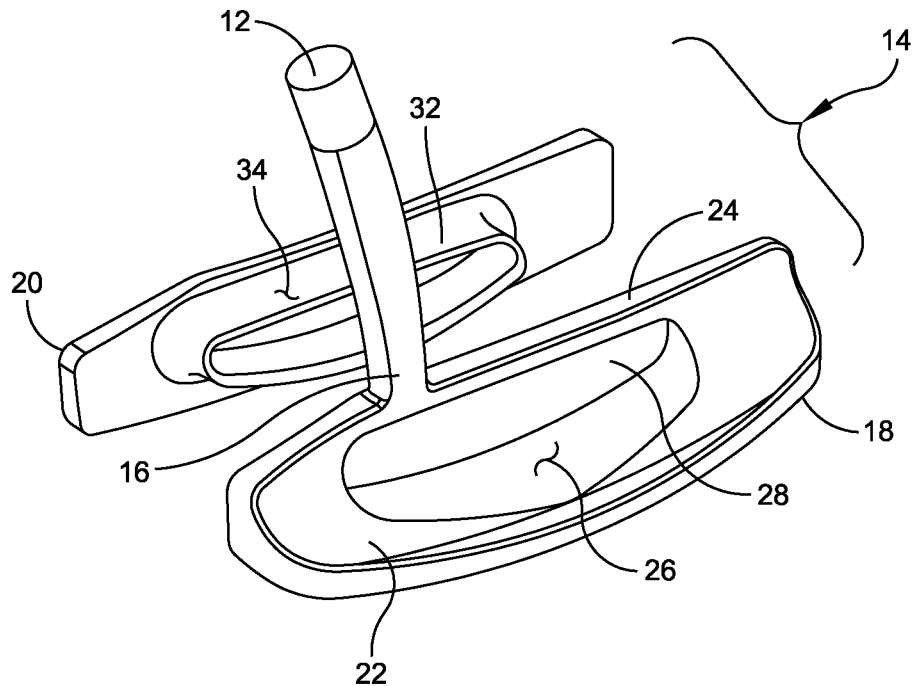
FIG. 3 is an exploded back perspective view of a face body and a back body of the head of the golf putter.
Figure 4:
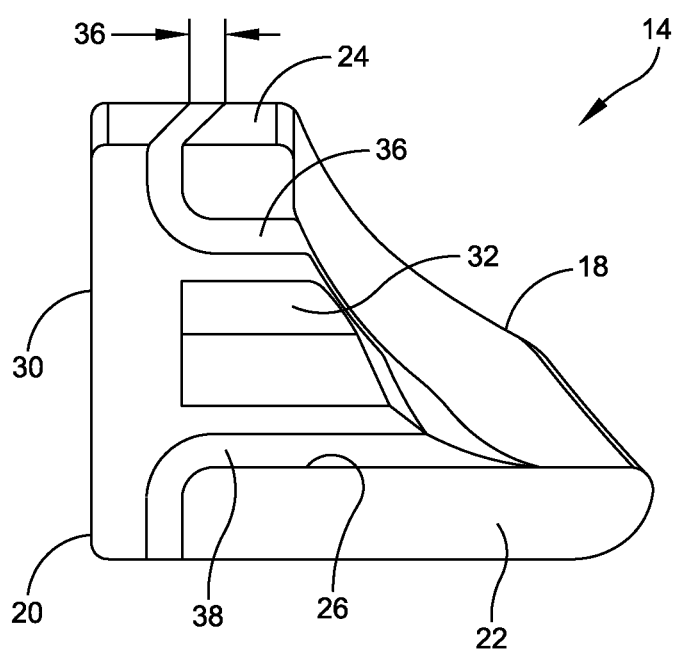
FIG. 4 is a cross-sectional view taken through a vertical mid-plane of the head of the golf putter.

With further reference to FIGS. 3 and 4, the head 14 of the golf putter 10 includes a metal back body 18 and a metal face body 20. The metal back body 18 is elongate in length relative to its height and width, having a relatively flat and wide heel portion 22 that is slightly curved with respect to a flat surface and a narrow top portion 24 that is adapted to be secured to the shaft 12, e.g., by the hosel 16. A surface 26 formed in the heel portion 22 and the top portion 24 of the metal back body 18 defines an irregularly-shaped opening 28, which is centrally located in the metal back body. The purpose of this construction will become apparent as the description of the head 14 proceeds.

The metal face body 20 of the head 14 is also elongate in length relative to its height and width, having on one side thereof a golf ball contact surface 30 (FIG. 1) and on an opposite side thereof an insert configuration 32 that is designed to fit within the irregularly-shaped opening 28. The insert configuration 32 includes an outer surface 34. The arrangement is such that the metal back body 18 and the metal face body 20 have substantially corresponding, non-planar, inter-fitting surfaces 26, 34, respectively, facing one another without contact across a gap 36 (FIG. 4) defined by the inter-fitting surfaces. These surfaces 26, 34 are shaped to substantially correspond with one another. In some embodiments, the metal back body 18 and the metal face body 20 may be die cast, machined, forged or otherwise manufactured from the same or different materials. Such materials may include any suitable metal or alloy. Suitable non-metallic materials may include wood, ceramic, glass, stone, and the like.

Figure 5:
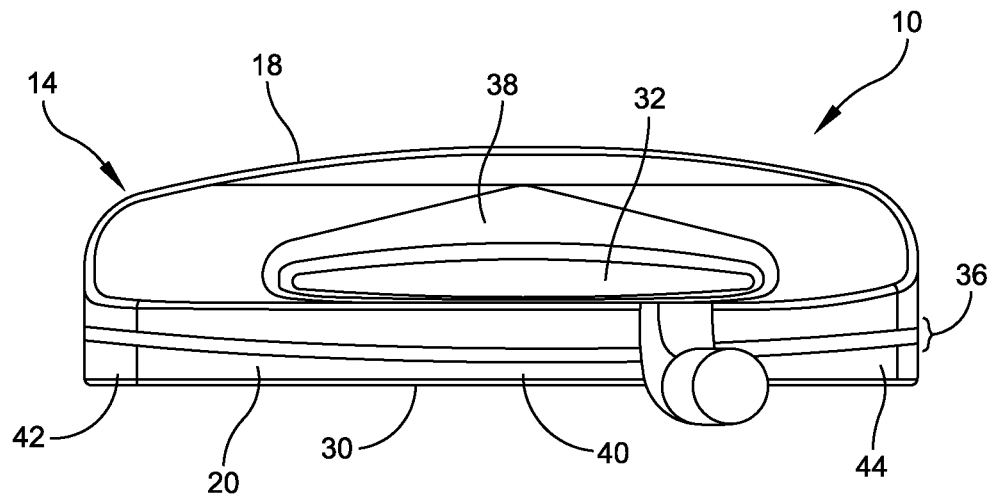
FIG. 5 is a top plan view of the head of the golf putter.
Figure 6:
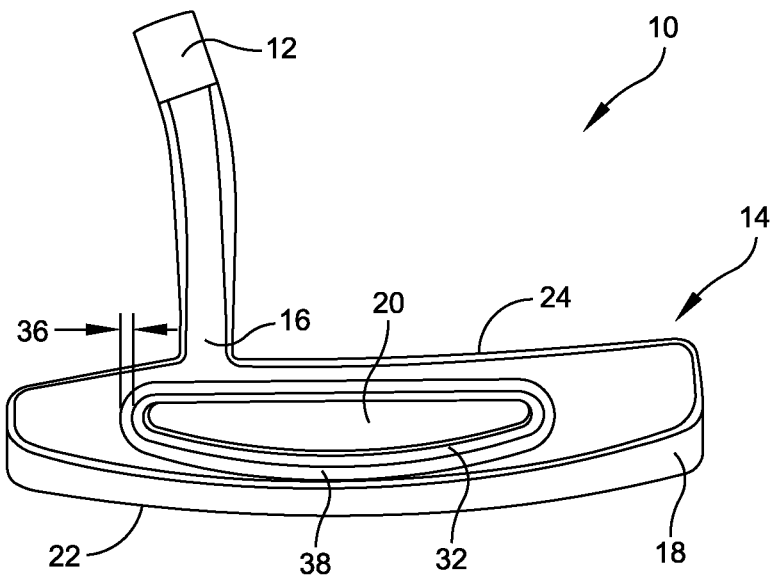
FIG. 6 is a back view of the head of the golf putter.

Referring to FIGS. 5 and 6, the head 14 further includes a vibration dampening intermediate body 38, which is provided to fill the gap 36 between the surface 26 forming the opening 28 of the metal back body 18 and the outer surface 34 of the insert configuration 32 of the metal face body 20 to isolate the metal back body from the metal face body. In one embodiment, the vibration dampening intermediate body 38 includes a polymeric material. Particularly, the polymeric material includes at least one material selected from the group of following materials: urethane, polyester, silicone, rubber, polypropylene, polyethylene, polycarbonate, acrylonitrile-butadien-styrene (ABS), polyvinyl chloride (PVC), nylon, acrylic, acetal, and the like. The result is that the metal face body 20 is permanently joined to the metal back body 18. The vibration dampening intermediate body 38 acts as a vibration dampening device in addition to mechanically joining the two metal back and face bodies 18, 20 together. The golf putter 10 is assembled by placing the metal back body 18 and the metal face body 20 in a mold (not shown) designed to ensure the gap 36 is provided between the respective bodies, into which a liquid polymer (or other suitable material) is poured or otherwise injected to substantially fill the gap. Once the polymer is set, the head 14 of the golf putter 10 is removed from the mold where it can be attached to the shaft 12.

Referring specifically to FIG. 5, the metal face body 20 of the head 14 includes a middle portion 40 positioned between two end portions 42, 44. As shown, the end portions 40, 42 have a thickness that is slightly thicker than a thickness of the middle portion 40. This construction is designed to lessen the negative effects of not squarely striking the golf ball during a putting stroke in which the golf ball is struck with either end portion 40, 42.

As best shown in FIGS. 5 and 6, the vibration dampening intermediate body 38 fills the gap 36 between the metal back body 18 and the metal face body 20. This construction creates part of an exterior surface of the head 14 of the golf putter 10, which can be used to create a visual interest, an aiming aide and the like.

In some embodiments, the surface 26 of the metal back body 28 and the outer surface 34 of the insert configuration of the metal face body 20 may be treated or otherwise configured to improve the manner in which the metal face body is secured to the metal back body by the vibration dampening intermediate body 38. For example, the surfaces 26, 34 may be treated with a surface finish, such as an adhesive, to improve the adhesion of vibration dampening intermediate body 38 to the surfaces. Alternatively, or in addition to treating the surfaces 26, 34, the surfaces may be formed with ribs or other formations to increase the surface areas of the surfaces thus improving the adhesion of the vibration dampening intermediate body 38 to the respective surfaces. For example, holes or undercuts may be formed on the surfaces of the bodies so that when the intermediate body material is molded, the intermediate body material flows around and through to mechanically link the bodies without relying exclusively on surface adhesion. Alternatively, a primer may be applied to the metal bodies where a polymer over-mold touches to improve surface adhesion.

Figure 7A:
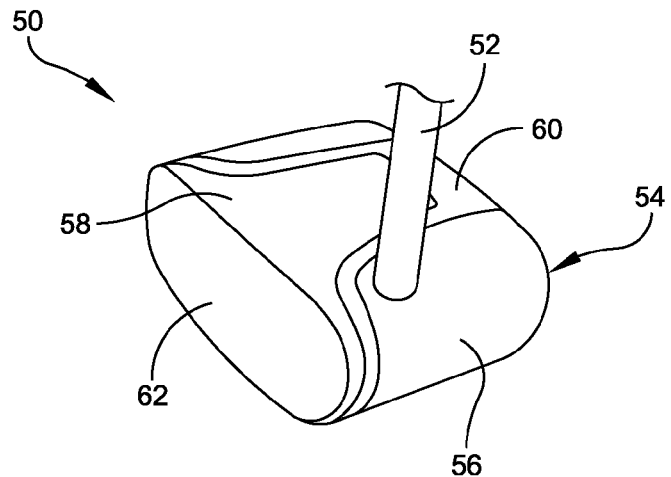
FIGS. 7A, 7B and 7C are views showing a head of a golf putter of another embodiment of the present disclosure.
Figure 7B:
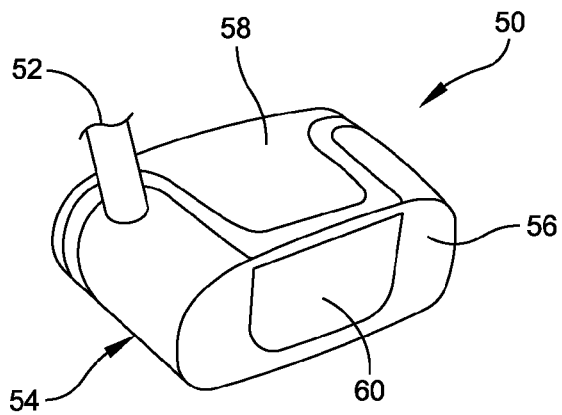
Figure 7C:
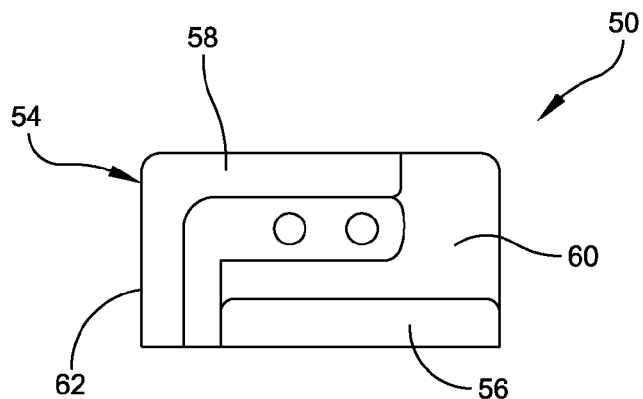

Referring to FIGS. 7A, 7B and 7C, a head of a golf putter of another design is generally indicated at 50. As shown, the golf putter 50 includes a shaft 52, which is partially illustrated, and head, generally indicated at 54. The head 54 includes a generally U-shaped metal back body 56 that is connected to the shaft 52 and a generally T-shaped a metal face body 58 that is received within the "U" of the metal back body. The head 54 further includes a vibration dampening intermediate body 60 disposed between the metal back body 56 and the metal face body 58. The metal face body 58 includes an extended crown surface 62 to provide more bounce at the crown than the sole thereby imparting more forward roll when struck.

Figure 8:
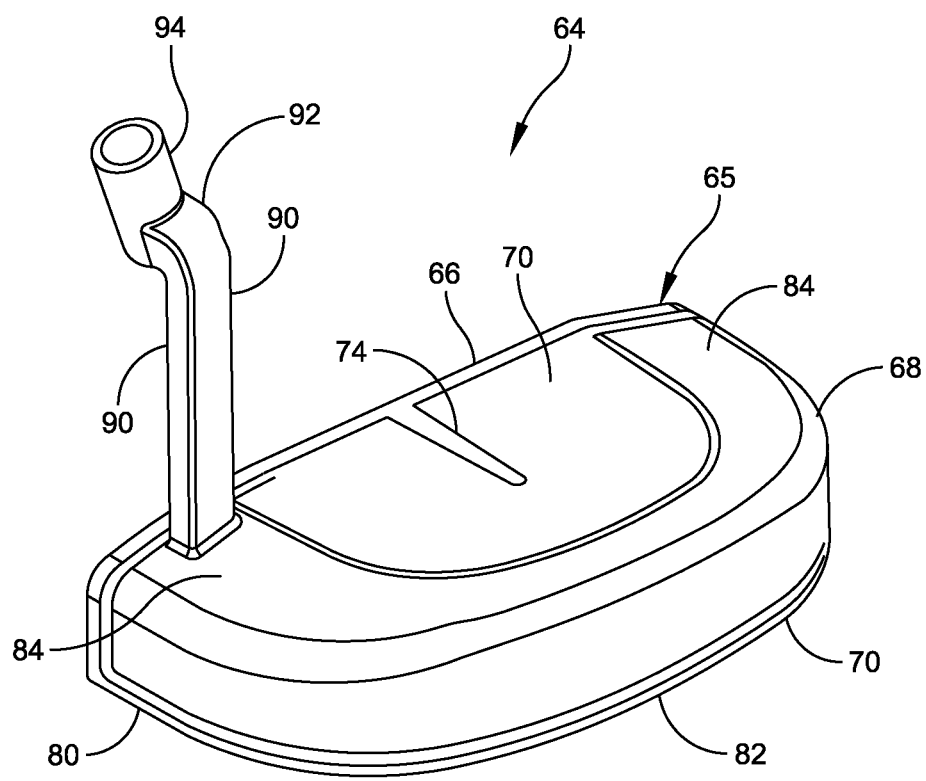
FIG. 8 is a back perspective view of a head of a golf putter of an embodiment of the present disclosure.

Referring to FIGS. 8, 9, and 10, a golf putter of another design is generally indicated at 64. As shown, a head 65 of the putter 64 includes a metal face body 66, a metal back body 68, and a vibration dampening intermediate body 70. The vibration dampening intermediate body 70 is disposed between the metal face body 66 and the metal back body 68 so that there is no direct contact between the metal face body 66 and the metal back body 68.

The metal face body 66 includes a golf ball contact surface 72 (FIG. 10) and on the opposite side thereof a rib 74, which may sometimes be referred to as an interlocking feature. The interlocking feature may be provided on the metal back body 68 in addition to or in place of the interlocking feature of metal face 66. The golf ball contact surface 72 is elongate in length relative to its height and width. The rib 74 is located at the center of the longitudinal length of the golf ball contact surface 72 and extends into a gap 76 between the metal face body 66 and the metal back body 68. The rib 74 is perpendicular to the longitudinal length of the golf ball contact surface 72 and includes two openings 78 formed therein through which the intermediate body 70 flows when being formed with the metal face body 66 and the metal back body 68. The top surface of the rib 74 is visible to a person using the putter 64 to hit a golf ball and acts as an aiming or alignment aid to strike the golf ball with the center of the golf ball contact surface 72.

The metal face body 66 also includes a bottom 80 that defines a sole or a bottom of the head 65 of the putter 64. The bottom 80, as well as the rest of the metal face body 66 is isolated from the metal back body 68 by the intermediate body 70. The bottom 80 lowers the center of gravity of the butter 64 and protects the intermediate body 70 from wear by shielding the intermediate body 70 from contact with a putting green, carpet or other surface or object during use or storage. The rib 74 extends vertically into the gap 76 and is perpendicular to the bottom 80.

In one embodiment, the metal face body 66 is a single piece of metal (e.g., by casting) that includes the golf ball contact surface 72, the rib 74, and the bottom 80 as integrally formed components. Alternatively, the golf ball contact surface 72, the rib 74, and the bottom 80 can be one or more separate components that are assembled or connected together to form the metal face body 66 using adhesives, press fittings, welding or combinations thereof.

The metal back body 68 has a generally horseshoe or U-shaped configuration and is isolated from the metal face body 66 by the vibration dampening intermediate body 70. The metal back body 68 has a substantially uniform height. Referring specifically to FIG. 9, the metal back body 68 has a central portion 82 and two lateral portions 84. The width of the lateral portions 84 is greater than the width of the central portion 82, thus distributing mass to the lateral portions 84 (e.g., to the perimeter of the head 65) and increasing the moment of inertia of the putter 64 relative to a central axis defined by the longitudinal length of the rib 74. The metal back body 68 can include the central portion 82 and the lateral portions 84 as integral components or separate components that are connected together to form the metal back body 68.

The metal back body 68 includes an inner extension 86 that protrudes inward into the gap 76 along the length of the horseshoe or U-shaped opening of the metal back body 68. The inner extension 86 has a plurality of openings 88 formed therein. With reference to FIG. 9, the vibration dampening intermediate body 70 is depicted transparently to illustrate the intermediate body 70 filling the gap 76 including the openings 78 and the openings 88 to join together the metal face body 66 and the metal back body 68. The intermediate body material need not be transparent. When the intermediate body 70 is molded, the intermediate body material fills the gap 76 and flows through the openings 78 and the openings 88 to mechanically link the metal face body 66 and the metal back body 68. The material that forms the intermediate body 70 (e.g., a polymeric material) has a lower density that the metal that forms the metal front body 66 and the metal back body 68, thus distributing mass of the putter 64 toward the perimeter of the head 65 and increasing the moment of inertia of the putter 64.

An extension or hosel portion 90 extends vertically upward from one of the lateral portions 84 of the metal back body 68. The extension 90 can be an integral part of the metal back body 68 or an independent component that is fixed to the metal back body 68. The extension 90 is disposed on the head 65 to distribute its mass about the perimeter of the head 65. The extension 90 has a rectangular cross section, although other cross sectional shapes, such as circular are possible.

The extension 90 has a bent end portion 92 configured to connect with a hosel 94. The hosel 94 connects the head 65 with a shaft (not shown in FIGS. 8-10) and the hosel 94 and bent end portion 92 are configured to place as little mass as possible over the top of the head 65 to lower the center of gravity of the putter 64. The hosel 94 can be an integral part of the extension 90 (or the metal back body 68) or may be provided separately.

With reference to FIGS. 8-10, the metal face body 66, the metal back body 68 and the vibration dampening intermediate body 70 can be made from the same material, respectively, as the metal face body 20, the metal back body 28 and the vibration dampening intermediate body 38 described above.

As described above, a method of fabricating a head of a golf putter includes placing the metal back body and the metal face body in a mold with the a gap being provided between the metal back body and the metal face body, and depositing a polymeric material in the mold to create the vibration dampening intermediate body positioned between the metal back body and the metal face body. After curing, the head is removed from the mold.

Thus, it should be observed that the contact surface of the golf putter of embodiments of the disclosure is completely isolated from the remaining components of the golf putter, including the metal back body and the shaft, to achieve softer contact and less bounce off the contact surface during a putting stroke. The entire contact surface is dampened, not just a face insert as with prior putter designs, thus achieving consistent dampening across the entire contact surface. Since the dampening occurs between the metal back body and the metal face body, the metallic contact surface is maintained for improved feel, applications of grooves, and better durability than prior polymer inserts. Since the vibration dampening intermediate body is introduced into the mold as a liquid and then set as a solid, any desired shaped gap may be filled between the metal back body and the metal face body. This construction enables the metal bodies and the dampening intermediate body to take on any shape and thickness, which may be desired when designing golf putters.

Having thus described at least one embodiment of the present invention, various alternations, modifications and improvements will readily occur to those skilled in the art.

Such alterations, modifications and improvements are intended to be within the scope and spirit of the invention. Accordingly, the foregoing description is by way of example only and is not intended to be limiting. The invention's limit is defined only in the following claims and equivalents thereto.

For example, although most golf putters have a 32-inch to a 35-inch shaft (slightly shorter for most ladies and juniors, longer for most men), golf putters are also made with longer shaft lengths and grips, and are designed to reduce the number of moving parts during the putting motion. One example is a belly putter, which is typically about six to eight inches longer than a normal putter and is designed to be anchored against the stomach of the player. This design reduces or removes the importance of the hands, wrists, elbows, and shoulders and thus reduces the number of moving parts while putting. Another example is a long putter, which is even longer than a belly putter and is designed to be anchored from the chest or even the chin and similarly reduces the impact of the hands, wrists, elbows and shoulders. The principles disclosed herein with reference to golf putters 10 and 50 may be applied to belly putters and long putters.

As putting is one of the most important aspects of a player's golf game, a variety of teaching tools are available to assist the player in learning correct putting technique. The principles disclosed herein also may be applied to teaching tools, such as training clubs designed to teach the golfer to use a steady, even putting motion without any sudden pressure applied by the hands or arms to swing the club or to hit a straight shot.

In addition, the shape of the cavity created by the back and the face bodies may be designed to have any suitable shape to enable the vibration dampening intermediate body to assume any suitable shape.

What is claimed is:

1. A golf putter head comprising:
a back body adapted to be secured to a golf club shaft;
a face body including a planar golf ball contact surface and an at least partially non-planar rear surface opposite the contact surface, the face body including an entirety of the contact surface such that an outermost perimeter of the face body defines an outermost perimeter of the golf putter head;
the back body and the face body having non-planar surfaces without contact across a gap defined by the non-planar surfaces; and
a vibration dampening intermediate body filling the gap to isolate the face body from the back body by completely separating the back body and the face body from one another, the intermediate body being permanently affixed to the back body and the face body, the intermediate body extending to and forming portions of multiple outer surfaces of the putter head excluding the contact surface in a continuous manner.

2. The golf putter head of claim 1, wherein the vibration dampening intermediate body includes a polymeric material.

3. The golf putter head of claim 2, wherein the polymeric material includes at least one of the following materials—urethane, polyester, silicone, rubber, polypropylene, polyethylene, polycarbonate, ABS, PVC, nylon, acrylic, and acetal.

4. The golf putter head of claim 1, further comprising a hosel configured to attach the back body to the shaft.

5. The golf putter head of claim 1, wherein at least one of the back body and the face body includes an interlocking feature configured to secure the at least one of the back body and the face body to the vibration dampening intermediate body.

6. The golf putter head of claim 1, wherein portions of the intermediate body extend to at least four of an approximate six sides of the golf putter head, excluding the contact surface.

7. The golf putter head of claim 1, wherein portions of the intermediate body extend to at least five of an approximate six sides of the golf putter head, excluding the contact surface.

8. The golf putter head of claim 1, wherein a portion of the face body extends from the contact surface to form a substantial portion of a top outside surface of the golf putter head.

9. The golf putter head of claim 1, wherein a portion of the intermediate body is positioned between the back body and a portion of the face body forming a portion of a top outside surface of the putter head.

10. The golf putter head of claim 1, wherein a portion of the face body extends from the contact surface to form a substantial portion of a bottom outside surface of the golf putter head.

11. The golf putter head of claim 10, wherein a portion of the intermediate body is positioned between the back body and a portion of the face body forming a portion of a bottom outside surface of the putter head.

12. The golf putter head of claim 1, wherein the intermediate body includes a substantial portion of a central volume of the golf putter head.

13. The golf putter head of claim 1, wherein the intermediate body includes a predominantly non-uniform thickness.

14. The golf putter head of claim 1, wherein outside surfaces of the intermediate body include a substantial portion of outside surfaces of the golf putter head.

15. A golf putter comprising:
a shaft; and
a head including
a back body adapted to be secured to the shaft,
a face body including a golf ball planar contact surface and an at least partially non-planar rear surface opposite the contact surface, the face body including an entirety of the contact surface such that an outermost perimeter of the face body defines an outermost perimeter of the golf putter head,
the back body and the face body having non-planar surfaces without contact across a gap defined by the non-planar surfaces, and
a vibration dampening intermediate body filling the gap to isolate the back body from the face body by completely separating the back body and the face body from one another, the intermediate body being permanently affixed to the back body and the face body, the intermediate body extending to and forming portions of multiple outer surfaces of the putter head excluding the contact surface in a continuous manner.

16. The golf putter of claim 15, wherein the vibration dampening intermediate body includes a polymeric material.

17. The golf putter of claim 16, wherein the polymeric material includes at least one of the following materials—urethane, polyester, silicone, rubber, polypropylene, polyethylene, polycarbonate, ABS, PVC, nylon, acrylic, and acetal.

18. The golf putter of claim 15, further comprising a hosel configured to attach the back body to the shaft.

19. The golf putter of claim 15, wherein at least one of the back body and the face body includes an interlocking feature configured to secure the at least one of the back body and the face body to the vibration dampening intermediate body.

* * * * *